(12) United States Patent
Leroux et al.

(10) Patent No.: US 10,274,312 B2
(45) Date of Patent: Apr. 30, 2019

(54) 3D SURFACE SCANNING WHITE LIGHT AXIAL CHROMATISM DEVICE

(71) Applicant: Nanovea, Inc.

(72) Inventors: Pierre Leroux, Laguna Hills, CA (US); Fernando Valenzuela, Lake Forest, CA (US); Curt Deckert, Santa Ana, CA (US)

(73) Assignee: Nanovea, Inc., Irvine, CA (US)

(*) Notice: Subject to any disclaimer, the term of this patent is extended or adjusted under 35 U.S.C. 154(b) by 0 days.

(21) Appl. No.: 16/109,502

(22) Filed: Aug. 22, 2018

(65) Prior Publication Data

US 2018/0364031 A1  Dec. 20, 2018

Related U.S. Application Data

(63) Continuation-in-part of application No. 15/976,065, filed on May 10, 2018.

(60) Provisional application No. 62/504,935, filed on May 11, 2017.

(51) Int. Cl.

| G01J 3/40 | (2006.01) |
|---|---|
| G01B 11/24 | (2006.01) |
| G02B 5/18 | (2006.01) |
| G02B 26/10 | (2006.01) |
| G01B 11/00 | (2006.01) |
| G01J 3/18 | (2006.01) |

(52) U.S. Cl.
CPC ............ *G01B 11/24* (2013.01); *G01B 11/005* (2013.01); *G02B 5/1814* (2013.01); *G02B 5/1842* (2013.01); *G02B 26/101* (2013.01); *G01B 2210/50* (2013.01); *G01J 3/18* (2013.01)

(58) Field of Classification Search
CPC ...... G01J 3/26; G01J 3/10; G01J 3/433; G01J 3/453; G01B 11/14; G01B 11/24; G01B 11/00; G02B 26/10; G02B 5/18
See application file for complete search history.

(56) References Cited

U.S. PATENT DOCUMENTS

2007/0229801 A1* 10/2007 Tearney ............... A61B 5/0062
356/73

* cited by examiner

*Primary Examiner* — Abdullahi Nur
(74) *Attorney, Agent, or Firm* — Hankin Patent Law, A.P.C.; Kevin Schraven; Anooj Patel

(57) ABSTRACT

A system and device that measures a specimen's surface profile by passing a bright white light source through a series of lenses which generate repeatable chromatic focal shift variations of wavelengths of white light for Z axis measurements. The movement of the sensor along an X-Y raster pattern is controlled by a X-directional and Y-directional scanner used in combination with X and Y actuators. The system and device translate the chromatic focal shifts into digital data which may then be used to both control the position of the lenses along the surface of the specimen and generate a 3D topographical images of the specimens being profiled.

20 Claims, 11 Drawing Sheets

3D SURFACE SCANNING WHITE LIGHT AXIAL CHROMATISM DEVICE

CROSS-REFERENCE TO RELATED APPLICATIONS

This patent application is a Continuation-in-Part application of U.S. Non-Provisional patent application Ser. No. 15/976,065, titled Live 3d Surface Scanning White Light Axial Chromatism Device And System, Filed on May 10, 2018, the contents of which are expressly incorporated herein by this reference as though set forth in their entirety and to which priority is claims. U.S. Non-Provisional patent application Ser. No. 15/976,065 takes priority from U.S. Provisional Patent Application No. 62/504,935, titled Live 3D Surface Scanning White Light Axial Chromatism Device and System, filed on May 11, 2017, the contents of which are expressly incorporated herein by this reference as though set forth in their entirety and to which priority is claimed.

FIELD OF USE

The present disclosure is generally relating to non-contact profilometers, particularly to an optical white light profilometer using axial chromatism to generate three-dimensional surface measurements.

BACKGROUND

A "profilometer" is an instrument used to measure a sample's surface profile in the z-direction to generate three-dimensional measurements.

Profilometers are either contacting or non-contacting measuring instruments. A contacting profilometer generates topographical information using physical contact with the surface. A non-contacting profilometer generates topographical information using optical instrumentation.

White light axial chromatism is a type of non-contact profilometry. Bright white light passing through a series of lenses, called the "Optical Pen," generates a high degree of chromatic focal shift refracted by the Optical Pen. The various refractive indexes of the lenses vary the focal distance of each wavelength of the white light source such that each refracted wavelength of the white light focuses at a different distance. The diffraction of each wavelength corresponds to a height differential of the specimen surface area. The direct calibrated measurement of wavelength diffraction prevents the introduction of errors generated by fixed algorithms used to convert the optical displacement to height.

Generally, non-contact surface profilometry may be done by either moving the sample on a motorized table in a raster X-Y pattern or by moving the optical pen in relation to the specimen. Non-contact surface profilometry may use either a single point sensor or a line sensor. A single point sensor generates height measurements along a line. Point sources of light on sensors improve the accuracy of the measurement by preventing interference from adjacent sources of light. This is referred to as "cross-talk" between the diffracted wavelengths. But point sensors reduce data collection speed and can miss hidden artifacts on the surface. In contrast, a line sensor uses multipoint data collection to increase data collection speed, but the increase in cross-talk of diffracted wavelengths may decrease the accuracy of measurements, unless there are special programming to detect the "best fit" corresponding two a particular "Z" location.

Thus, what is needed is a fast white light axial Chromatism height imaging live speed of 1 Hz or more, which is forty times the speed before the device of the present disclosure. What is also needed is a device where there is no need for a X-Y motorized table to obtain 3D height surface information that eliminates cross talk from line sensors.

SUMMARY OF EMBODIMENTS

To minimize the limitations in the cited references, and to minimize other limitations that will become apparent upon reading and understanding the present specification, the live 3d surface scanning white light axial chromatism device and system herein preferably allow a user to measure a surfaces height variation in the z-direction relative to longitudinal and axial coordinate with improved speed and accuracy.

In various embodiments, the methods and systems may be used to measure surface height and generate topographical images of a given specimen and gather data in a manner that is both recordable and repeatable, without damage to the specimen.

In general, the device and system may comprise a light source, a beam splitter, an Optical Pen, a movement assembly, a concave grating assembly to detect each different wavelength of light with a camera, and a signal processing assembly. This device assembly/device uses a very bright white light source which increases the intensity of present levels diffracted light by over 100 times the intensity of market alternatives.

To compensate for the additional cross-talk created by increasing the intensity of the source light, the assembly uses an Optical Pen assembly and high speed motorized scanning assembly which increases the speed and accuracy.

Some advantages of the present system include: (a) increased imaging speeds over 40 times greater than current image speeds; (b) less or no dependence on a precision X-Y motorized table, which expands the application of the system use for inline quality control or microscopy applications; and (c) elimination of cross-talk from line sensors by using a single scanning spot.

The spectral wavelength output received by said camera is converted into digital data and sent to a signal processing assembly, which generates useful 3D surface data about an object in approximately 1 second.

One embodiment of the device of the present disclose may comprise:

(1) A white light source, which may be capable of at least or approximately 10 mW of visible power, which is an intensity of 100 times higher than the standard LED light source currently in use for typical white light axial chromatic applications. The white light source may be laser driven, such as in the case of a Fianium™ White Lase micro compact supercontinuum laser or similar light source using different techniques.

(2) A fiber-optic beam splitter and fiber coupler assembly and a fiber optic cable with a core diameter of approximately 10μ (10 microns).

(3) A collimating lens, which may consist of a standard optical glass achromat with a low reflection coating.

(4) The second stage lens or lenses, and third stage lens or lenses that are capable of off-axis image correction. Here a single lens set could be used for second and third stage lens sets. The second stage lens set was originally devised to focus the area of sensing into an X-Y image and then the third stage lens set would reduce the scan coverage so that the final image size and spot size were reduced to approximately 2 microns for high resolution systems and to approximately 10 microns for medium resolution systems. The NA of the third lens set would be on the order of 0.5 for high resolution systems and 0.4 for medium resolution systems. If an alternate configuration were to be used that combined second stage lenses with third stage lenses one would need to replace the whole lens assembly to go from medium resolution to high resolution. The specific lens configuration of the device of the present disclosure may be designed using ZEMAX® or other similar optical design program. Lenses required will be singlets, achromats, and aspherics to achieve the necessary NA, useful scan areas, and depth of the chromatic focus in the Z axis.

(5) A "scanning assembly", which may comprise an X-Y reflective scanner mirror, mechanism, or similar device. For scanning in the X direction, the scanner movement assembly may include a reflective polygon scanner assembly and motor. For scanning in the Y direction, the scanner mechanism may include an independent voice coil, linear, stepper or similar motor to drive the "X" polygon scanner in the "Y" direction. Rotation angles of both drives/motors may preferably provide the capability of at least a +/−6-degree angle change and the mirror changing speed of the polygon mirrors may be approximately 1000 Hz. This may determine the size of the useful scan area and the overall speed of the system. The resolution required will also influence the speed of the scan.

(6) The optical pen assembly may also include the collimating lens and be attached to the fiber cable from the light source. The collimating lens will collimate the light from the fiber and then focus the return light from the scanner, second stage lens or lenses, and third stage lens or lenses on to the fiber core. The specific lens configuration of the collimating lenses may be designed using ZEMAX® or other similar optical design program. It is highly probable that a standard lens will work in this application.

(7) A "concave grating assembly," is used directly with the fiber input to focus the spectral band on the sensors in the line scan camera. The concave grating replaces collimating input lens and a focusing output lens that is usually found in spectrographs and other devices using flat reflective or transmitting gratings.

(8) The line scan camera reads image data one line at a time. In the preferred embodiment the line scan camera my use detection speeds over 100K lines per second to detect light at wavelengths corresponding to a calibrated Z dimension.

(9) A "signal processing assembly", which comprises the data processing system, control apparatus, and acquisition software for controlling the profilometer and storing calibration data. The acquisition software may also convert height information into 3D topographical images.

In various embodiments, the above preferred components may be further defined as follows:

1. The light source provides sufficient spectral intensity to allow for increased data acquisitions speeds. The power input may preferably be between 100V and 240V, at 50/60 Hz. The visible optical power output to the fiber optics splitter may be on the order of 10 mW.
2. A fiber-optic beam splitter or coupler assembly with fiber optic cables will transmit the source light to the sample surface and then to the lens grating assembly.
3. The optical pen including stage 2 and 3 lenses will reduce the diameter of light contacting the specimen and focuses the return light on the fiber that transmits to the concave grating assembly. The collimating lens that directs the light to the scanner assembly also focuses the return light on the fiber to go to the concave grating. The second stage lens or lenses focuses and defines the scan area. The third stage lens or lenses reduce the spot size.
4. The scanning assembly may allow for recording of coordinates in the X-Y directions by using internal X and Y encoders.
5. The lens grating assembly may isolate specific spectral wavelengths (more than one surface output) and convert the calibrated spectral displacement into digital data which may be manipulated further by the signal processing assembly.
6. The Signal Processing Assembly may receive user input data, and data from the light source, optical pen, movement assembly and lens grating assembly, to generate user outputs. Resolution may be increased by interpolation of the camera sensor pixels. These user outputs may include 3D coordinate data, specimen plots, and safety information.

This disclosure presents a system capable of reaching over 16,000 KHz allowing the scan of a 4 mm×4 mm area at medium resolution without the use of a x-y motorized table in less than one second. This is over forty times faster than single line systems other than that which is disclosed by the present disclosure. The present system achieves this speed through its unique set of lenses that transmit the proper cone of light (depending on the NA of the third or last stage of optics before reaching the target to be measured) so as to allow the focus point on the surface of the sample, which may then be returned and measured by a sensor.

The use of a white light source, even though it is generated by a laser, rather than using a laser is taught against by prior systems. Lasers are much easier to deal with than white light, and do not require the same series of lenses. The present disclosure provides the specific technologies that are needed in order to use white light.

One embodiment may be a white light axial chromatism device, comprising: a white light source; one or more collimating lenses; one or more second stage lenses; one or more third stage lenses; an X-Y directional scanner; a camera; and a grating; wherein the white light source generates a light that may be directed through the one or more collimating lenses, then to the X-Y directional scanner, then through the one or more second stage lenses, then through the one or more third stage lenses, then to a sample to be imaged; wherein a reflection light from the sample may pass back through the one or more third stage lenses, through the one or more second stage lenses, to the X-Y directional scanner, and through the one or more collimating lenses, and is sent to the grating; wherein the grating diffracts and splits the reflection light from the sample into a spectral wavelength output on a receiving surface; wherein the camera receives the spectral wavelength output from the receiving surface; and wherein the plurality of spectral wavelength output received by the camera may be converted into digital data and sent to a signal processing assembly. The camera may be a line scan camera and the line scan camera may correct a resolution of the plurality of spectral wavelength output, perform the digital data conversion, and transmit the digital data to the signal processing assembly. The device may further expressly include the signal processing assembly, wherein the signal processing assembly comprises a host computer and a camera assembly controller, which comprises a processor and a memory. The host computer may be configured to accept one or more user inputs, which may comprise at least one of scan data, resolution data, camera settings, and calibration data. The host computer may be configured to provide one or more outputs, which may include one or more of a system status, three-dimensional plot data, imaging data, a plurality of three-dimensional plots, and one or more safety issues. The camera assembly controller may comprise a processor and a memory, and may be configured to: (1) receive instructions and calibration data from the host computer; (2) receive x-positional data; (3) receive y-positional data; (4) send movement instructions to the X-Y directional scanner; (5) send light instructions to the white light source; (6) interpolate z-coordinate data; (7) determine a saturation of the sample to be imaged; (8) perform one or more calibrations with the calibration data. The white light source may comprise: (1) a repetition rate of at least (or approximately) 27 MHz; (2) a visible power output of at least (or approximately) 25 mW; and (3) a spectral output that is unpolarized with a single mode Gaussian output in the range of approximately 450 nm to 2000 nm. The line scan camera may comprise one or more of: a minimum line rate of 200 kHz; a total pixel capacity of at least 2000 pixels; a bit depth of between 8 and 12 bits; an operating temperature of 0-65° C.; a responsivity of at least 65 Dn/nJ/cm2 at 1× gain for the 8-bit depth; a dynamic range of at least 65 dB; a visible light spectrum capability in the range of 400-700 nm; and a near-infrared light spectrum capability in the range of 700-1000 nm. The X-Y directional scanner, and the one or more collimating lenses, which allows for an increased speed of making calibrations and adjustments to the X-Y directional scanner. The X-Y directional scanner may be a reflective polygon scanner that comprises an x-axis motor and a y-axis motor. The white light axial chromatism device may scan both stationary and moving samples.

Another embodiment may be a white light axial chromatism system, comprising: a white light source; one or more collimating lenses; one or more second stage lenses; one or more third stage lenses; an X-Y directional scanner; a line scan camera; a grating; and a signal processing assembly; wherein the signal processing assembly comprises a host computer and a camera assembly controller, which comprises a processor and a memory; wherein the white light source generates a light that may be directed through the one or more collimating lenses, then to the X-Y directional scanner, then through the one or more second stage lenses, then through the one or more third stage lenses, then to a sample to be imaged; wherein a reflection light from the sample passes back through the one or more third stage lenses, through the one or more second stage lenses, to the X-Y directional scanner, and through the one or more collimating lenses, and may be sent to the grating; wherein the grating diffracts and splits the reflection light from the sample into a spectral wavelength output on a receiving surface; wherein the camera receives the spectral wavelength output from the receiving surface; wherein the plurality of spectral wavelength output received by the camera is converted into digital data and sent to a signal processing assembly; and wherein the line scan camera corrects a resolution of the plurality of spectral wavelength output, performs the digital data conversion, and transmits the digital data to the signal processing assembly. The host computer may be configured to accept one or more user inputs, which comprises at least one of scan data, resolution data, camera settings, and calibration data. The host computer may be configured to provide one or more outputs, which comprises at least one of a system status, three-dimensional plot data, imaging data, a plurality of three-dimensional plots, and one or more safety issues. The camera assembly controller may do one or more of the following: (1) receives instructions and the calibration data from the host computer; (2) receives x-positional data; (3) receive y positional data; (4) send movement instructions to the X-Y directional scanner; (5) send light instructions to the white light source; (6) interpolate z-coordinate data; (7) determine a saturation of the sample to be imaged; (8) perform one or more calibrations with the calibration data. The white light source may comprise one or more of: (1) a repetition rate of at least (or approximately) 27 MHz; (2) a visible power output of at least (or approximately) 25 mW; and (3) a spectral output that is unpolarized with a single mode Gaussian output in the range of approximately 450 nm to 2000 nm. The line scan camera may comprise one or more of: a minimum line rate of approximately 200 kHz; a total pixel capacity of at least 2000 pixels; a bit depth of between 8 and 12 bits; an operating temperature of 0-65° C.; a responsivity of at least (or approximately) 65 Dn/nJ/cm2 at 1× gain for the 8-bit depth; a dynamic range of at least 65 dB; a visible light spectrum capability in the range of 400-700 nm; and a near-infrared light spectrum capability in the range of 700-1000 nm. The X-Y directional scanner, and the one or more collimating lenses, which allows for an increased speed of making calibrations and adjustments to the X-Y directional scanner. The X-Y directional scanner may be a reflective polygon scanner that comprises an x-axis motor and a y-axis motor.

Another embodiment may be a white light axial chromatism device and system, comprising: a white light source; one or more collimating lenses; one or more second stage lenses; one or more third stage lenses; an X-Y directional scanner; a line scan camera; a grating; a host computer; and a camera assembly controller, which comprises a processor and a memory; wherein the white light source generates a light that is directed through the one or more collimating lenses, then to the X-Y directional scanner, then through the one or more second stage lenses, then through the one or more third stage lenses, then to a sample to be imaged; wherein a reflection light from the sample passes back through the one or more third stage lenses, through the one or more second stage lenses, to the X-Y directional scanner, and through the one or more collimating lenses, and is sent to the grating; wherein the grating diffracts and splits the reflection light from the sample into a spectral wavelength output on a receiving surface; wherein the camera receives the spectral wavelength output from the receiving surface; wherein the plurality of spectral wavelength output received by the camera is converted into digital data and sent to a signal processing assembly; wherein the line scan camera corrects a resolution of the plurality of spectral wavelength output, performs the digital data conversion, and transmits the digital data to the camera assembly controller; wherein the host computer is configured to accept one or more user inputs, which comprises at least one of scan data, resolution data, camera settings, and calibration data; wherein the host computer is configured to provide one or more outputs, which comprises at least one of a system status, three-dimensional plot data, imaging data, a plurality of three-dimensional plots, and one or more safety issues; wherein the camera assembly controller: (1) receives instructions and the calibration data from the host computer; (2) receives x-positional data; (3) receive y positional data; (4) send movement instructions to the X-Y directional scanner; (5) send light instructions to the white light source; (6) interpolate z-coordinate data; (7) determine a saturation of the sample to be imaged; (8) perform one or more calibrations with the calibration data; wherein the X-Y directional scanner is a reflective polygon scanner that comprises an x-axis motor and a y-axis motor; wherein the movement instructions cause at least one of the x-axis motor and the y-axis motor to actuate and adjust the X-Y directional scanner contemporaneously; wherein the white light source may comprise one or more of: (1) a repetition rate of at least (or approximately) 27 MHz; (2) a visible power output of at least (or approximately) 25 mW; and (3) a spectral output that is unpolarized with a single mode Gaussian output in the range of approximately 450 nm to 2000 nm; wherein the line scan camera may comprise one or more of: a minimum line rate of approximately 200 kHz; a total pixel capacity of at least (or approximately) 2000 pixels; a bit depth of between approximately 8 and 12 bits; an operating temperature of 0-65° C.; a responsivity of at least (or approximately) 65 Dn/nJ/cm2 at 1× gain for the 8-bit depth; a dynamic range of at least (or approximately) 65 dB; a visible light spectrum capability in the range of approximately 400-700 nm; and a near-infrared light spectrum capability in the range of or approximately 700-1000 nm; wherein additional cross-talk that is created by the high intensity of the while light source may be compensated for by the specific configuration of, or by the antireflective coating on, the one or more third stage lenses, the one or more second stage lenses, the X-Y directional scanner, and the one or more collimating lenses, which allows for an increased speed of making calibrations and adjustments to the X-Y directional scanner.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Figure 1:
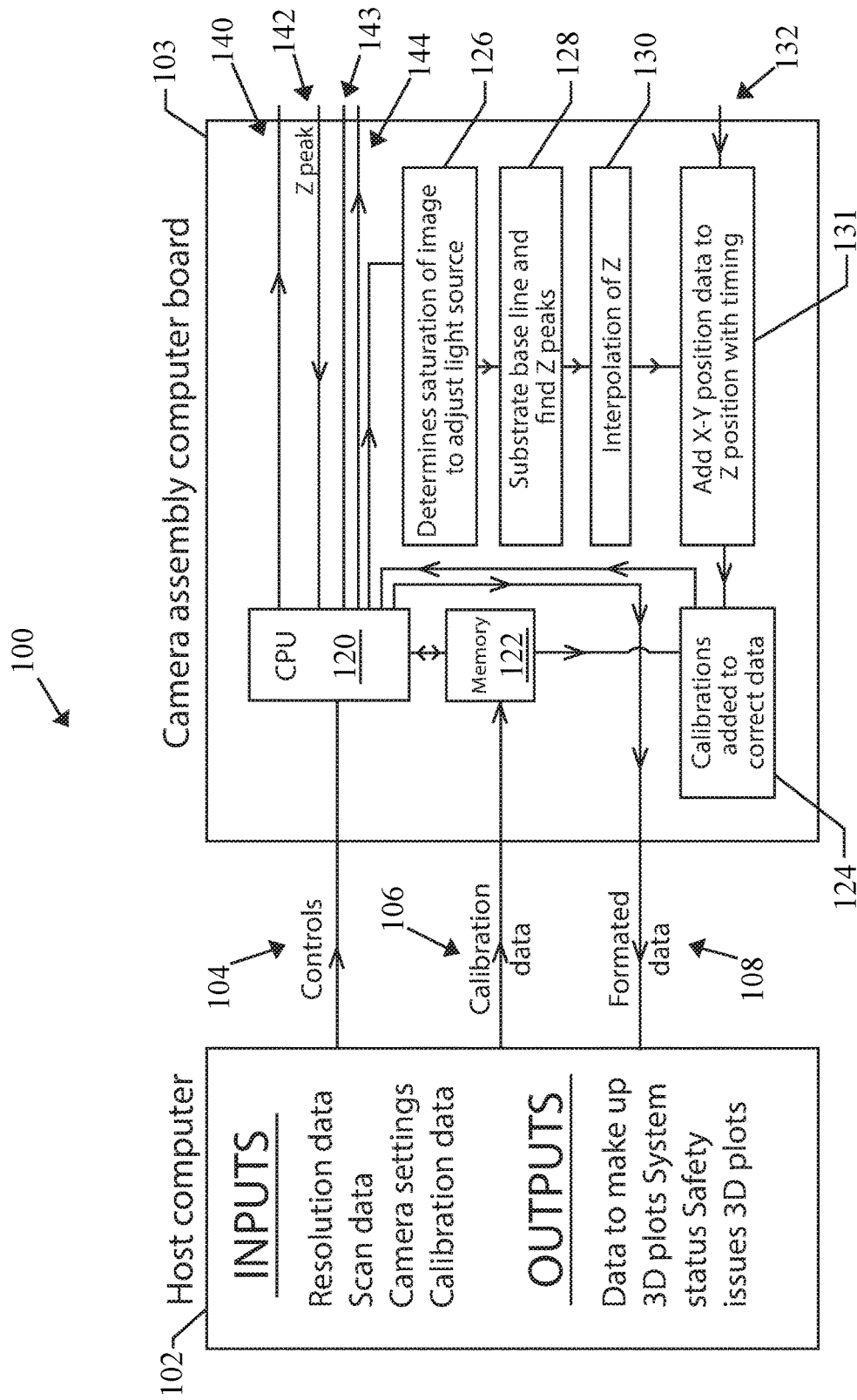
FIG. 1 is a schematic block diagram of one embodiment of a first part of a live 3D surface scanning white light axial chromatism device and system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As is used in the specification and the appended claims, the singular forms "a," "an," and "the" include plural referents unless the context clearly dictates otherwise. Ranges expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. In the following detailed description, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments.

While multiple embodiments are disclosed, still other embodiments will become apparent to those skilled in the art from the following detailed description. As will be realized, these embodiments are capable of modifications in various obvious aspects, all without departing from the spirit and scope of protection. Accordingly, the screenshots, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

Embodiments of the present invention will now be described, by way of example, with reference to the accompanying drawings.

FIG. 1 is a schematic block diagram of one embodiment of a first part of a live 3D surface scanning white light axial chromatism device and system. The white light axial chromatism system 100 is continued on FIG. 2. The white light axial chromatism system 100 may comprise a host computer 102 and a camera assembly controller 103. The host computer 102 allows the user to control 104 the system 100. The host computer 102 may allow the user to input desired resolution data, scan data, camera settings, and/or calibration data 106. The host computer 102 may also allow the users to output information from the system 100, including data 108 needed to make three-dimension (3D) plots, system status information, safety issues, and 3D plots. The camera assembly controller 103 may comprise processing unit 120, memory 122, and calibration module 124. The camera assembly controller may determine the saturation of image in order to adjust the light source 126, substrate baseline and find z-peak 128, and interpolate z coordinates 130. The controller 103 may add the x-y position data to the z position with timing 131. The controller 103 gets x-y feedback data 132 from the x-y controller 218, shown in FIG. 2. The controller 103 (1) sends control signals 144 to the x-y controller 218, (2) sends and receives control signals and information 140, 142 to and from line scan camera 202 (shown in FIG. 3), and (3) sends control instructions 143 to light source 306 (shown in FIG. 2).

Figure 2:
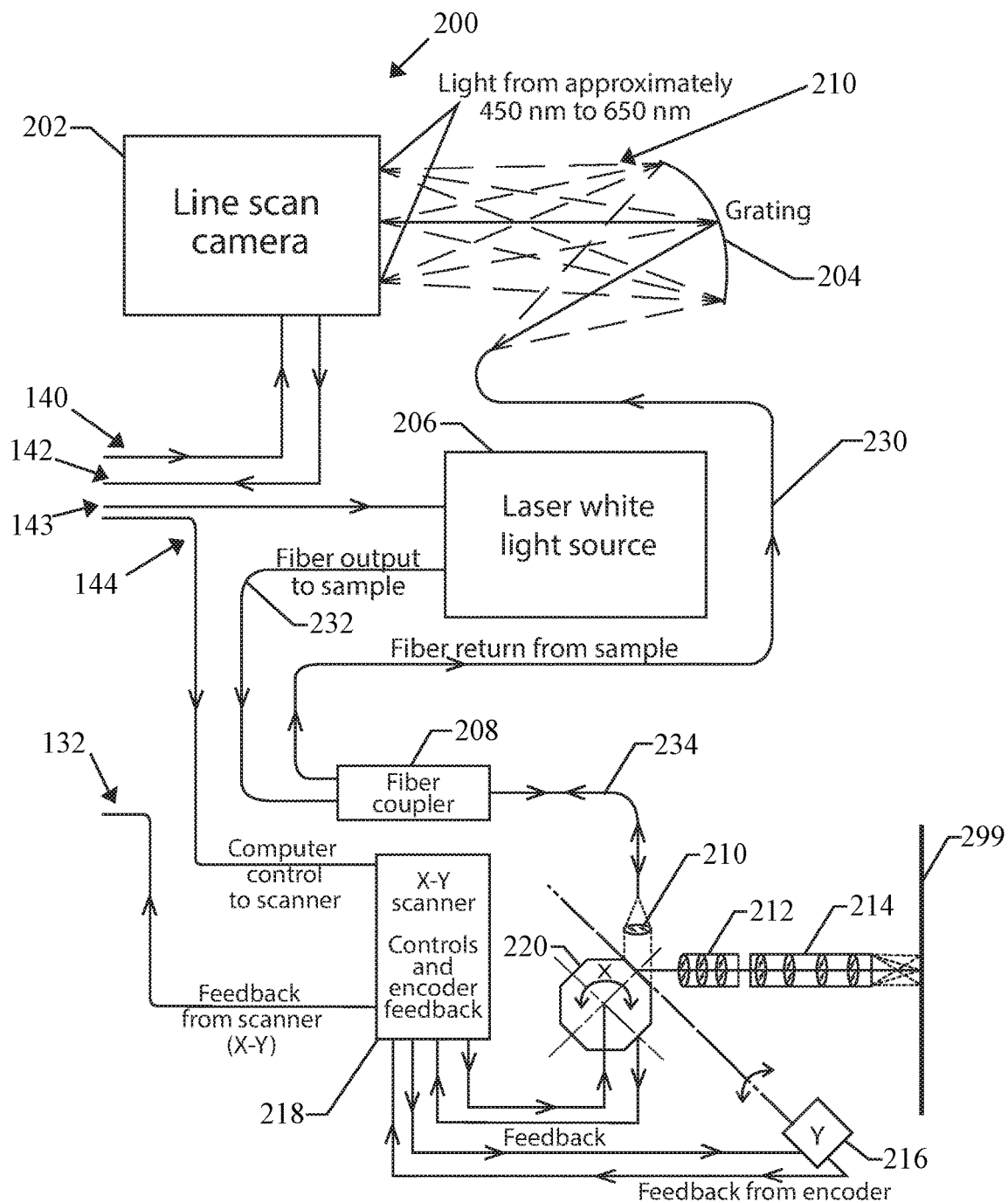
FIG. 2 is a schematic block diagram of one embodiment of a second part of a live 3D surface scanning white light axial chromatism device and system.

FIG. 2 is a schematic block diagram of one embodiment of a second part of a live 3D surface scanning white light axial chromatism device and system. FIG. 2 shows that the system 100 may comprise white light axial chromatism device 200 (profilometer), which may comprise a line scan camera 202, grating 204, light source 206, fiber optic cable coupler 208, collimating lens 210, second stage lenses 212, third stage lenses 214, x scanner 220 (polygon mirror), and y scanner 216. FIG. 2 shows that the white light source 206 is controlled 143 by the host computer 102. Light from light source 206 may enter fiber optic cable 232, pass through a fiber optic cable coupler 208, go on to collimating lens 210, then to x-y scanner 220, 216, then to second stage lenses 212, then to third stage lenses 214, and then finally to the sample/object 299. Light reflected from the sample 299 passes back through the lenses 210, 212, 214, back through the coupler 208, through fiber optic cable 230, to the grating lens 204, and finally on to line scan camera 202. FIG. 2 shows that the x-y controller 218 turns and/or actuates x-scanner 220 and y scanner 216, so that the system 100 can adjust the reflection/scan rate through the optical pen or second and third stage lenses 212, 214. Although three second stage lenses and four third stage lenses are shown, as few as one, or more than three or four lenses may be included, depending on the desired application.

The system 100 and device 200 shown in FIGS. 1-2 shows that the bright white light is essential to attaining imaging speed and data acquisition covering the equivalent of 10,000,000 points a second within a specified space for one or two surfaces. The fiber optic splitter 208 transmits light from the light source 206 to the object to be measured via the collimating lens 210 to the object 299 to be measured, and then transmits the reflected light from the object 299 to be measured to the grating 204 and camera 202 assembly. This makes it possible to use one fiber optic cable 230 to communicate depth information to the grating 204 and camera 202 assembly.

The first stage lens or lenses 210, are taken into account for the overall chromatic shift of a collimating lens, which provides tight collimation of light at the scanner 220/216 and a small spot sizes at the target 299. This also focuses the return light on the fiber optic cable 230 going to the grating 204 (which is preferably concave) and camera 202 assembly. The collimating lens 210 may preferably be a high quality 12 mm diameter lens/lenses to be able to focus return light onto a small fiber of the cable 230 going back through the coupler 208 to the grating 204 and camera 202 assembly and maintain a high numerical aperture (NA) at the target object 299. Numerical aperture (NA) of an optical system is a dimensionless number that characterizes the range of angles over which the system can accept or emit light. An example of a high NA would be 0.5 and higher.

The X-Y Reflective Scanner module 220, 216 may preferably be capable of at least +/−6 degree angle change in the two axes at the rate of approximately 1000 Hz moves of the x polygon scan and 1 Hz of the y scan the collimated beam off axis to produce the overall field size being viewed. The scanner may comprise a polygon scanner 220 for the fast axis and a voice coil or other means such as a stepper motor driving a worm gear assembly for the slow axis 216. The scanner module 216, 220 may preferably be fast and precise to meet lateral accuracy and allow the required speed of measurement. The scanner module 216, 220 may also preferably minimize the non-planarity effect on the target 299.

The second and third stage lenses 212, 214 are useful in order to further set the initial scan area, chromatic range, final pattern size, NA of the output beam, and the spot size of the output beam.

After reflection from the target 299, the light comes back through the same path, until it is diverted to the high-speed camera 202, to detects wavelength and intensity. Here the splitter 208 directs the return reflection from the object 299 being measured to the camera 202 and concave grating 204 assembly to break up the spectral wavelength output of the white light reflection prior to focusing it onto the line scan camera sensor where the concave surface serves as a means of substituting a collimated input and a focused output 202 optically sensing and recording the refracted/grated reflection.

The high-speed line scan camera 202, which preferably may have a capture rate speed over 100K lines/second contains sensitive sensors to detect light of specific wavelengths equated by calibration to vertical distances as determined by the host computer 102 by process the data 108.

The computer 102 may perform pattern detection computing to detect peaks and then use interpolation to precisely determine equivalent height by using calibration look-up tables of field curvature and chromatic variation over the scan area to compute actual heights. Acquisition software may be used to control acquisition scanning to get output height information leading to 3D surface information from the scanner's actual position. Preferably, the information from the detector may be translated by software into height information versus position of the scan on the object 299 surface. This information can then be used to make 3D maps of the area scanned.

Figure 3:
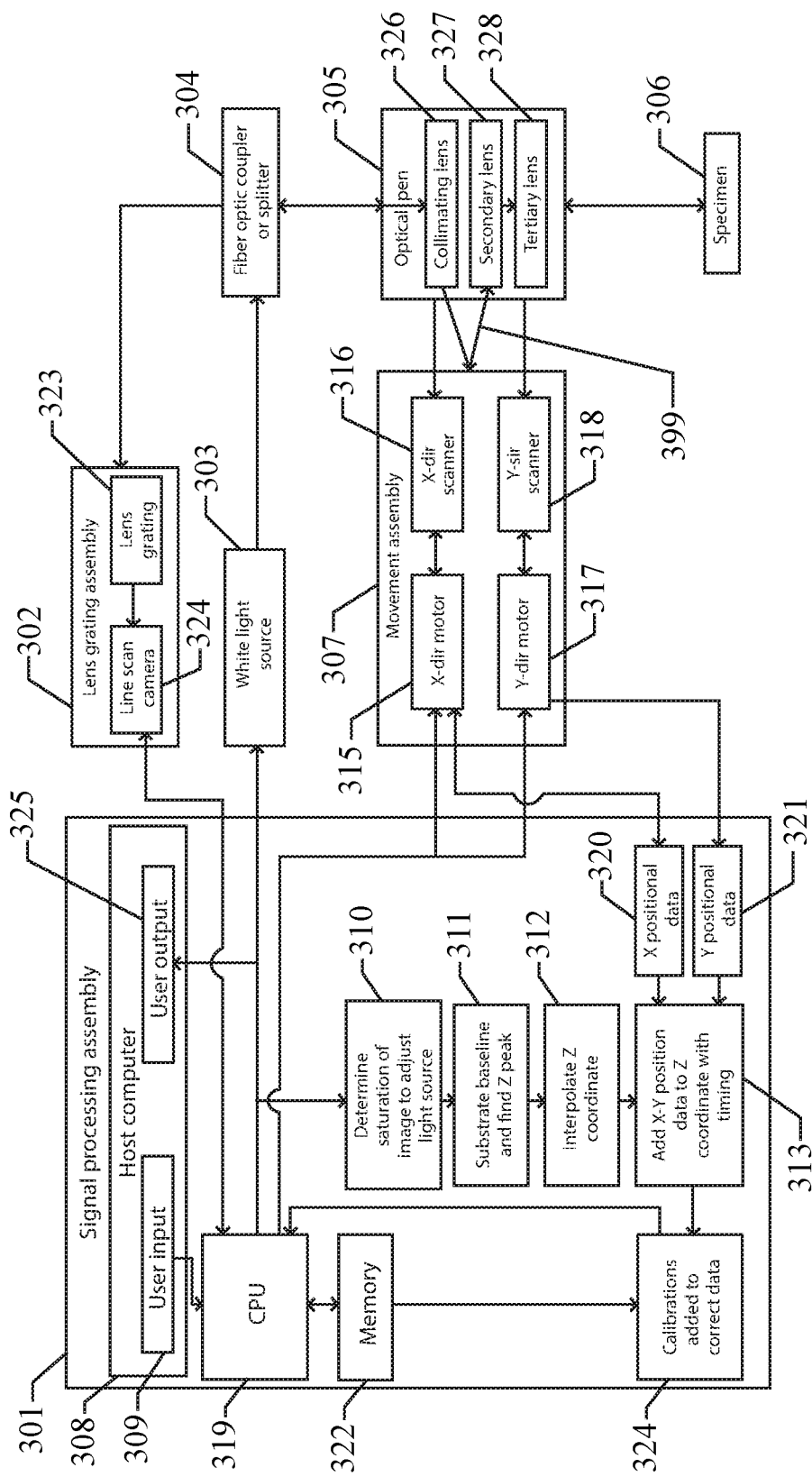
FIG. 3 is a schematic block diagram of another embodiment of a live 3D surface scanning white light axial chromatism device and system.

FIG. 3 is a schematic block diagram of one embodiment of a live 3d surface scanning white light axial chromatism device and system. The system may comprise a signal processing assembly 301, lens grating assembly 302, white light source 303, fiberoptic coupler or splitter 304, optical pen 305, specimen 306, and movement assembly 307.

The signal processing assembly 301 includes a host computer 308 which receives user input data 309 including resolution data, scan data, camera settings, and calibration data. The user input data 309 is transmitted to the central processing unit, ("CPU") 319 (also referred to as a processor), which controls the lens grating assembly 302, white light source 303, and movement assembly 307. The CPU/PROCESSOR 319 processes incoming data from these systems to determine the saturation of the image and adjust the power output of the source light 310, determine the specimen substrate height and peak z-coordinates 311, interpolate the z-coordinate 312, and combine this data with the X-Y positional data 313. Calibrations are used to correct each 3D data point 314 using X-positional data 320 and Y-positional data 321 from the movement assembly 307. this information is stored in the signal processing assembly's memory 322.

The CPU/processor 319 also engages the X-directional motor 315 and Y-directional motor 317 which in turn actuate the movement of the X-directional scanner 316 and Y-directional scanner 318 and receive the X and Y coordinate data along the specimen surface. The scanning assembly 307 controls the location of the optical pen 305 point of analysis in relation to the specimen 306.

The white source light 303 transmits light through a fiber-optic cable to a fiberoptic coupler or beam splitter 304, the optical pen 305, then to the specimen 306. The light reflects off the specimen 306 and transmits back through a fiber-optic cable to the reflective concave grating 323, which splits and diffracts the light according to the calibrated wavelengthes.

In one embodiment, the lens grating 323 may be mirrored, consisting of a reflective film on a glass surface. In this embodiment, the lens grating 323 is preferably concave. In alternative embodiments, the lens grating 323 may consist of rulings on a flat surface. This requires collimating optics on the input and focusing optics on the output to interface with the camera sensor. The advantage of a concave grating over a plane grating is its ability to produce sharp spectral wavelength output lines without the aid of additional lenses or mirrors. This makes the assembly useful in the infrared and ultraviolet regions in which these radiations would otherwise be absorbed upon passage through a lens. In another embodiment, the grating 323 may also be transparent, made of glass or similar material, with no reflective coating. In this embodiment, the surface will be ruled on flat glass or on a thin metal film deposited on the glass surface. Again, this requires additional optics for collimation and focusing.

The lens grating 323 will reflect the white source light to the receiving surface of the line scan camera 324. The line scan camera 324 receives the spectral displacement (spectral wavelength output) to generate digitized readout of the spectral area of interest corresponding to the Z axis and transmits the data to the CPU/processor 319 for processing.

The line scan camera 324 uses two-dimensional data acquisition to receive the spectral displacement and convert the displacement into digital data. A single pixel-line of spectral displacement may be captured by either moving the camera along a linear path or by moving the light source along a conveyor. The line scan camera 324 transmits data to the CPU/processor 19, which uses the data to generate user use outputs 325 including but not limited to three-dimensional plots of the specimen 306, system status, and safety issues.

FIG. 3 shows that the light passing through collimating lens 326 from the light source 303 may be directed 399 to the movement assembly 307 and then through second stage lens 327 and third stage lens 328, and then on to the specimen 306.

Figure 4:
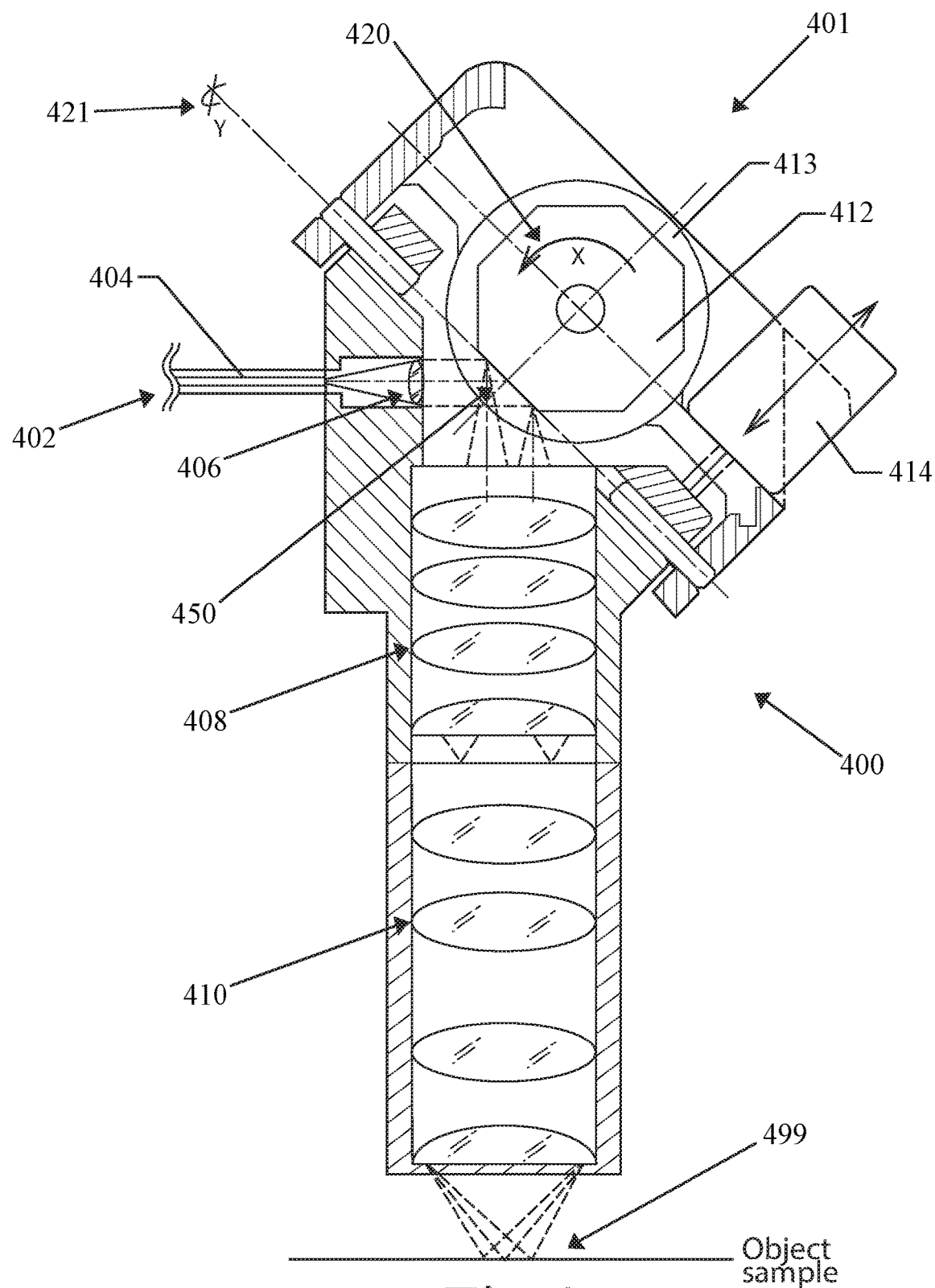
FIG. 4 is an illustration of one embodiment of the lenses and movement/scanning assembly of the profilometer device.

FIG. 4 is an illustration of one embodiment of the lenses and scanning assembly of the profilometer device. As shown in FIG. 4, the profilometer device 400 may comprise an x-y scanner 401, fiber optics from white light source 402, which may be directed to collimating lens/lenses 406 through fiber optic cable 404, second stage lenses 408 designed to form a focused image of the scanned area, and third stage lenses 410 designed to reduce the scanned image of the second stage lenses to get the spot size and total image size down to 2 microns for high resolution or 10 microns for medium resolution. The x-y scanner 401 may comprise reflective polygon scanner mirror 412, x-axis motor 413, and y-axis motor which can be a direct drive motor or a motor driving a worm gear set or some type of cam coupling that could also be used for a repetitive scanning motion from a simple rotary motor 414. For scanning in the Y-direction, the scanner 401 may also be driven by a motor 414, which may be an independent voice coil, linear, stepper or similar rotary motor. The Y-directional control will actuate the movement of the scanner along the Y-directional pivot 421. In this manner, the movement assembly 401 allows for scanning of the specimen 499 in a raster pattern of image capture and reconstruction. FIG. 4 also shows that the polygon mirror 412 may twist on x-axis 420 in response to movement driven by motor 413. The polygon mirror may be compatible with a 10-12 nm white light source beam diameter and may allow for a collimation beam at approximately 90 degrees from the final optics 408, 410. The scanner 401 may preferably be able to perform a 6 to 35-degree optical scan—depending on the polygon. The polygon scanner 401 may consist of compact ball bearings, and broadband enhanced reflective aluminum coating on the sides. The compact ball bearings may be housed on a mounting surface with an optical cantilever. The polygon mirror 412 may have eight facets, as shown, and may be capable of moving, twisting, and/or actuating at speeds up to 10,000 RPM, giving on the order of 1333 Hz of light at the target plane. The scanner 401 may have an approximately 90-degree feed angle and may return a 6 to 35-degree optical scan. The scanner motors may be powered by either induction or brushless motor technology. FIG. 4 shows that the light passing through the collimating lens/lenses 406 reflects off mirror 412 at point 450 and is directed through the second and third stage lenses where these sets of lenses may vary with different applications which may require high (2 microns) or medium resolution (10 microns) with an NA on the order of 0.4 to 0.5 for many applications. They would be made up of standard or custom singlets, achromats, or aspheric lenses where the number of lenses will depend on the fields covered, spot size, and the NA of the output beam.

The lenses 408, 410 may have an antireflective coating to prevent cross-talk. The lenses 408, 410 may be adjustable between scans, or may be automatically adjusted by the device based on feedback and signals from the controllers.

In an alternative embodiment, the X-directional scanning motor 413 may include a control mechanism for returning the device to a reference Y position for straight line scanning.

In an alternative embodiment, the polygon mirror of the scanner may be a polygon scanner consisting of 6 facets, 10 facets, or 12 facets. The number and size of facets will determine the overall weight of the profilometer and the rate of scanning. The NA required at the object will also affect the beam size, polygon scanner size, and lens size for the second and third stage lenses.

The scanner surface may also be coated with an alternative dielectric reflective coating and may be supplied with a complete, or captured, housing assembly. Scanner assembly may be assembled with a facet or as a separate rotor unit, or may be a small O.E.M. device.

In an alternative embodiment, the X-directional scanner may also be a multiple axis polygon scanner, capable of line-scanning both stationary and moving objects.

In an alternative embodiment, an X and/or Y-directional scanner may be a PZT scanner or similar device. The scanner may be made of a ceramic perovskite material or similar material that shows a marked piezoelectric effect, such that the compound changes shape when an external electric field is applied.

In an alternative embodiment, an X and/or Y-directional scanner may be a galvanometer scanner, or similar vector scanner with rotary encoder and control electronics that provide, for a desired angle or phase, the suitable electric current to the motor, galvanometer, or similar instrument used for detecting electric current. This galvanometer scanner may have a reflective coating. However, a galvanometer scanner may limit the pulse repetition potential of a high-speed pulsed white light source.

In an alternative embodiment, some X and/or Y directional scanner may be a micro-electro-mechanical system (MEMs), or similar device, but this is limited to low NA applications.

Figure 5:
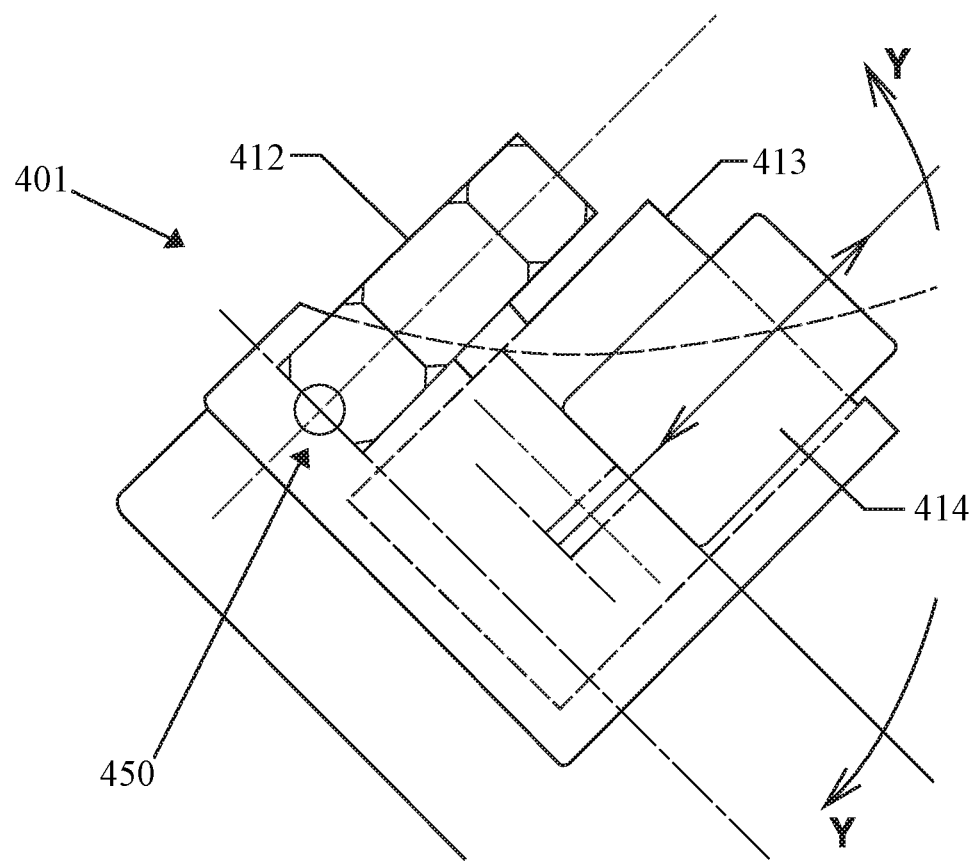
FIG. 5 is an illustration of a side view of one embodiment of the x-y scanner.

FIG. 5 is an illustration of a side view of one embodiment of the x-y scanner. As shown in FIG. 5, the polygon mirror 412 is operatively connected to the motor 413, while the other motor 414, which allow the mirror 412 to be tilted about the y axis (pivoting around 450) where the light reflects from the collimated source of light at 450 reflects off the reflective polygon to the second stage lenses.

In some embodiments, the motors may be driven by a limited-motion device that utilizes a permanent magnetic field and coil winding conductor to produce a force that is proportional to the current applied to the coil. This may be a voice coil actuator or similar device used in either linear or rotary motor application. The motor may also have a feedback control to return the Y- or X-sensor to a center or default position.

In an alternative embodiment, the Y-directional actuator or control may be a worn gearing driven by a high-speed stepper motor. In this embodiment, the stepper motor would provide a rotary movement that would simplify the correlation of location on the computer and may reduce the jitter caused by a voice coil motor. A stepper motor would drive a worm gear centered at 450 and the worm would be placed on the motor at 414.

Figure 6:
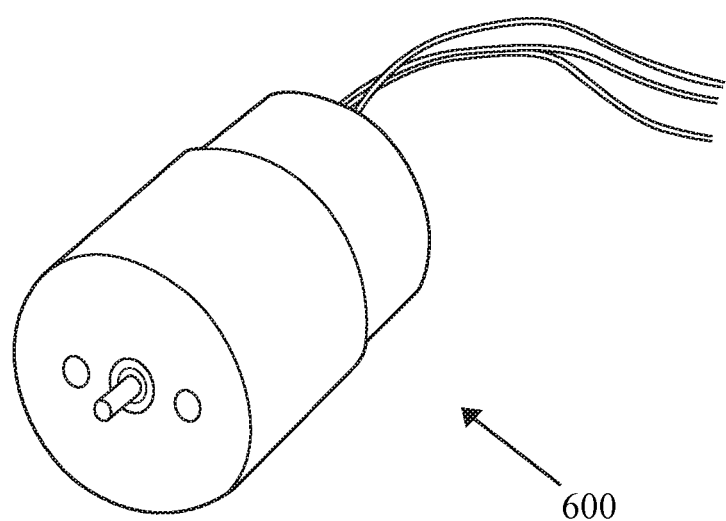
FIG. 6 is an illustration of one embodiment of a stepper motor for the x-y scanner.

FIG. 6 is an illustration of one embodiment of a stepper motor for the x-y scanner. As shown in FIG. 6, the x-y scanner may have one more stepper motors 600 that would have the worm placed on the stepper motor shaft. A stepper motor 600 may be a step motor or stepping motor that is a brushless DC (direct current) electric motor that divides a full rotation into a number of equal steps. The motor's position may be commanded to move and hold at one of these steps without any position sensor for feedback (an open-loop controller), as long as the motor is carefully sized to the application in respect to torque and speed. The preferred approach is to have an encoder on the shaft centered at 450.

Figure 7:
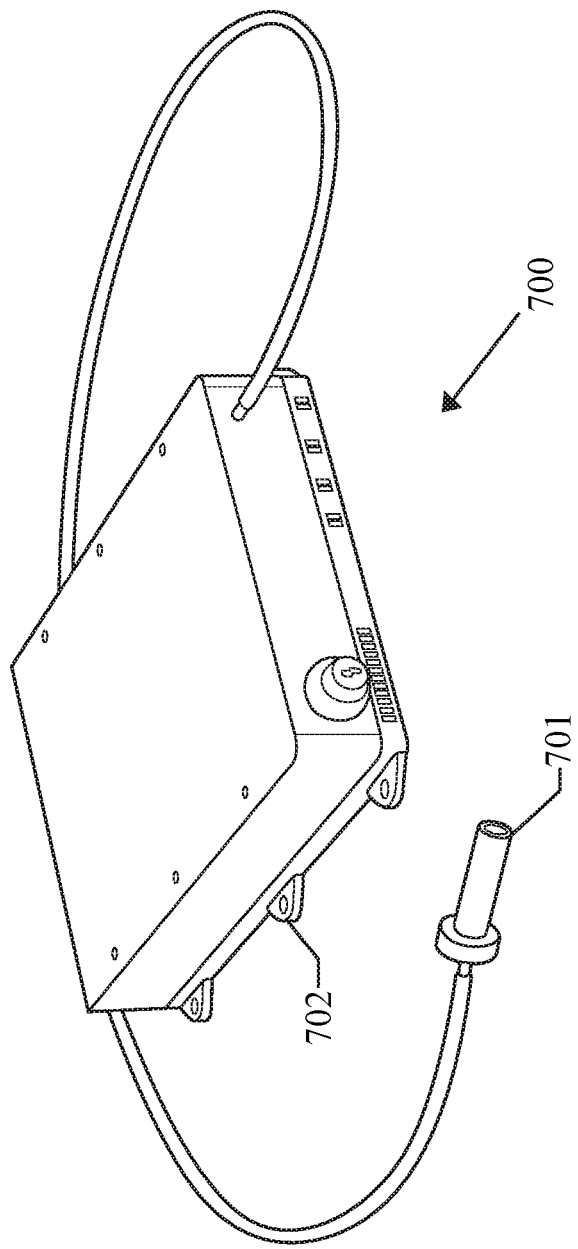
FIG. 7 is an illustration of one embodiment of a white light source.

FIG. 7 is an illustration of one embodiment of a white source light. FIG. 7 shows one embodiment of the white source light, which may be a turnkey light source such as a white source light that may be a white lase micro supercontinuum multi-purpose white-light source or similar device. The white source light may be capable of a light spectrum of at least 450 nm to 2000 nm and total output power of more than 200 mW 701. The light source may have the capacity to be mounted on an optical bench 702 and a small footprint. The white light source may transmit a serial communication of data using either RS232 serial port connection as per Recommended Standard 232, an RS-422, PR-485, or Ethernet connection.

In the preferred embodiment, the optical specifications of the white source light may be as follows:
 1. The light source may have a repetition rate of at least 27 MHz.
 2. The power stability will need to be within a variation of no more than 1.0%.
 3. The visible power output will be at least 25 mW. A very intensely bright light for axial chromatism.
 4. The spectral output will be unpolarized with a Gaussian, single mode output. In an alternative embodiment, the spectral output may also be polarized.
 5. The white source light apparatus will have at least a 65% single-mode fiber coupling efficiency rate in the fiber optic output with a core size in the order of 10 microns.

In one embodiment the mechanical and electrical specifications of the White Source Light will be as follows:
 1. The serial communication transmission of data will be with a Universal Serial Bus (USB) connection.
 2. The power output will be between 100V and 240V, or 50/60 Hz. The visible power output will be at least 25 mW.
 3. A 2-way LEMO interlock or similar connector used to make the state of two mechanisms mutually dependent. In an alternative embodiment, the spectral output may also be polarized.
 4. A photodiode oscillator monitor (SMA) or similar method for photodetection.
 5. An integrated air cooling system.

In an alternative embodiment, the optical specifications of the white source light may be as follows:
 1. The spectral output may be polarized with a non-Gaussian mode profile. However, the calibrations and corrections will require additional refinement for calculating the launch efficiency of the source light beam. The system may also require an increase visible power output to accommodate the modified spectral output.
 2. The power stability will have a variation of more than 1.0%. In this mode, the calibrations and corrections for light source intensity will require additional controls for adjusting the saturation of the image.
 3. The visible power output from the light source will be on the order of 25 mW. In this mode, the optical pen design and lens grating assembly will need to be modified to accommodate a greater spectral output. Here there is also an issue of optical correction on the stage 2 and 3 lenses This will need to be taken into account in the lens design, grating selection, and in the line scan camera selected The scanning assembly may also be adjusted for higher or lower processing speeds.

In another embodiment, the white light source may be lamp energized by electrical current, such an arc lamp or similar apparatus for producing light. This apparatus may include a chamber and ignition source that ionizes a gas within the chamber. The white light source may consist of an arc between electrodes through a gas in a contained environment. This embodiment may include a voltaic arc lamp, a fluorescent lamp, a Xeon arc lamp, carbon arc lamp, or similar technology.

In another embodiment, the white source light may be a lamp energized by a plasma lamp or laser. This embodiment may generate light by exciting plasma inside a closed transparent burner or bulb using radio frequency power. The lamp may use noble gas or a mixture of these gases and additional materials such as metal halides, sodium, mercury, or sulfur. In this embodiment, a waveguide may be used to constrain and focus the electrical field into the plasma. A high-efficiency plasma light source, generating efficiencies of 90 lumens per watt or more may also be used. Other light sources, such as arc lamps or laser driven plasma sources, may be used but they are not as efficient and the resulting stray light could block out the low-level return signal that is used to decode height measurements. They also have a limited life and are not as stable as the laser driven fiber optic white light generators. Some reflective optics could be used, but the chromatic issue is different and it would be difficult to get the range of Z measurement desired. They could also be difficult to align and package.

Figure 8:
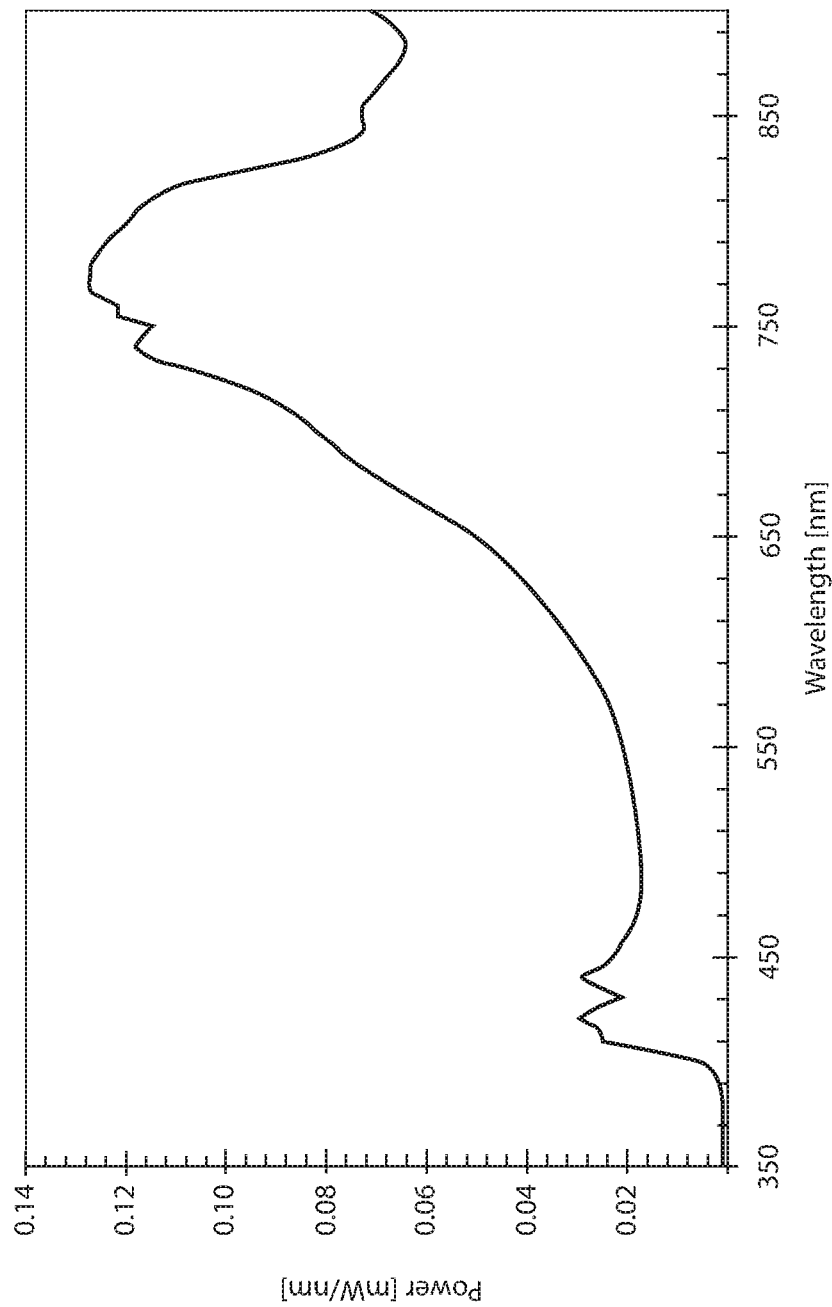
FIG. 8 shows the typical visible light output spectrum of the white light source as a function of wavelength and power output.

FIG. 8 shows the typical visible light output spectrum of the white source light as a function of wavelength and power output.

Figure 9:
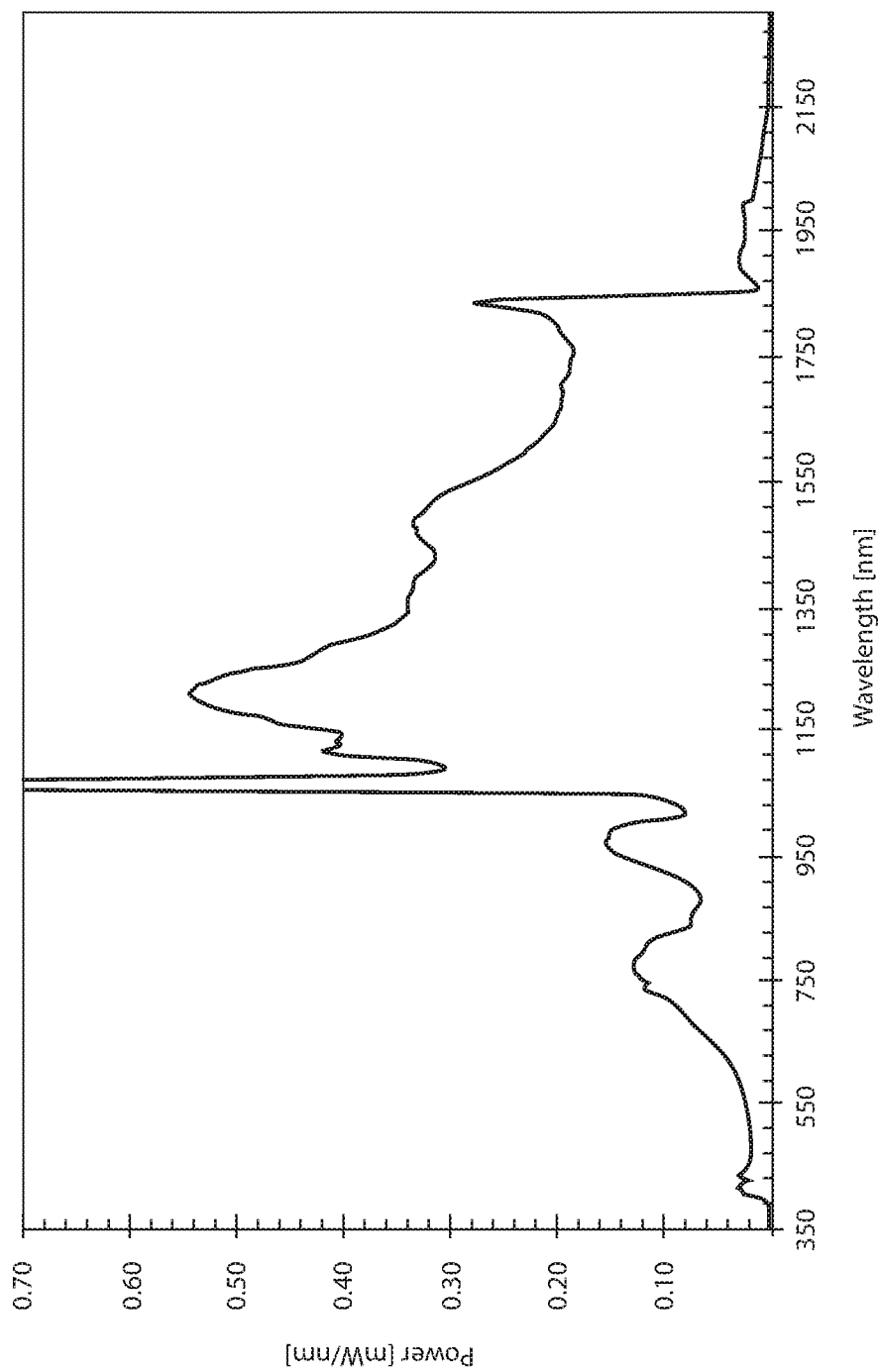
FIG. 9 shows the overall output spectrum of the white light source as a function of wavelength and power output.

FIG. 9 shows the typical output spectrum of the white source light as a function of wavelength and power output.

Figure 10:
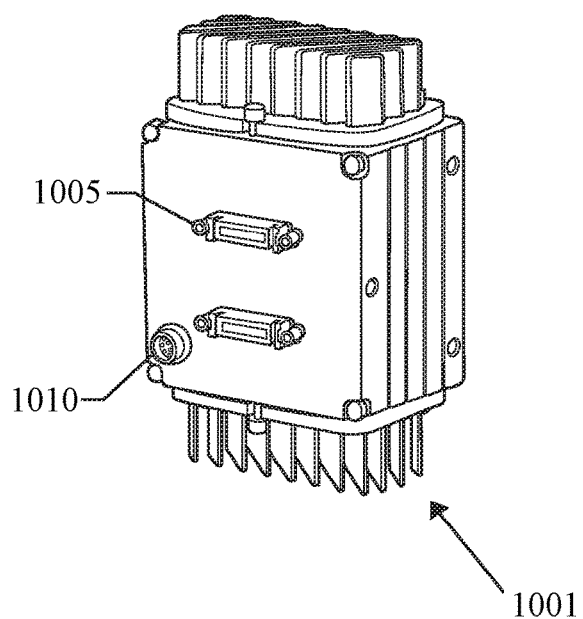
FIG. 10 is an illustration of a back view of one embodiment of a high-speed line scan camera.
Figure 11:
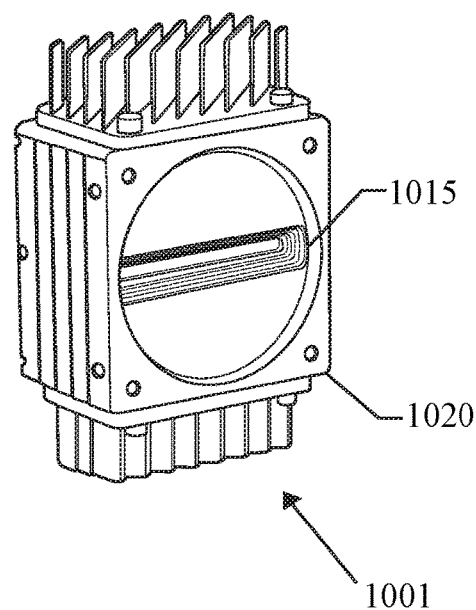
FIG. 11 is an illustration of a front view of one embodiment of a high-speed line scan camera.

FIG. 10 is an illustration of a back view of one embodiment of a line scan camera. FIG. 11 is an illustration of a front view of one embodiment of a line scan camera. In a preferred embodiment, the line scan camera 1001 may have a sensor 1015 may be capable of minimum line rate of 200 kHz. The camera 1001 may have a protective housing 1020. The line scan camera 1001 may transmit data using one more data ports 1005 which may send data using a serial port connection as per Recommended Standard 232, RS-422, PR-485, or an Ethernet connection. The line scan camera 1001 may also include a power connection 1010 capable of receiving a direct current source. In an alternative embodiment, the power connection 1010 may also receive an alternating current source.

The line scan camera 1001 pixel size should be large enough to allow enough signal and small enough to give the optimal resolution. As the intensity of the white source light is increased, the pixels size of the line scan camera 1001 may be decreased.

In one embodiment, the line scan camera may be a Pirahna4 2 k, 100/200 kHz the line scan camera 1001 or similar apparatus with the following specifications.
1. a total pixel capacity of at least 2 thousand pixels;
2. a bit depth of between 8 and 12 bits;
3. an operating temperature of 0-65° C.;
4. a responsivity of at least 65 Dn/nJ/cm2 at 1× gain for the 8-bit depth;
5. a dynamic range of 65 dB;
6. sub-pixel spatial corrections;
7. HDR mode; and
8. Shading and lens correction;
9. CMOS or similar sensor technology
10. Camera Link or similar supported interface; and
11. A Spectrum Capability of between 400-700 nm of visible light and an alternate approach of using 700-1000 nm of near-infrared light. There are potential applications in both regions, but the concave grating may limit the efficiency of applications operating in the visible and infrared regions In an alternative embodiment, a sensor with two or more lines may be used. In this embodiment, the line scan camera must be capable of vertically pooling the signal of several lines without losing resolution. In another embodiment, a time delay integration may also be included to add additional lines to the overall signal and increase the sensitivity to reduce the risk of blurring the image-capture.

Figure 12:
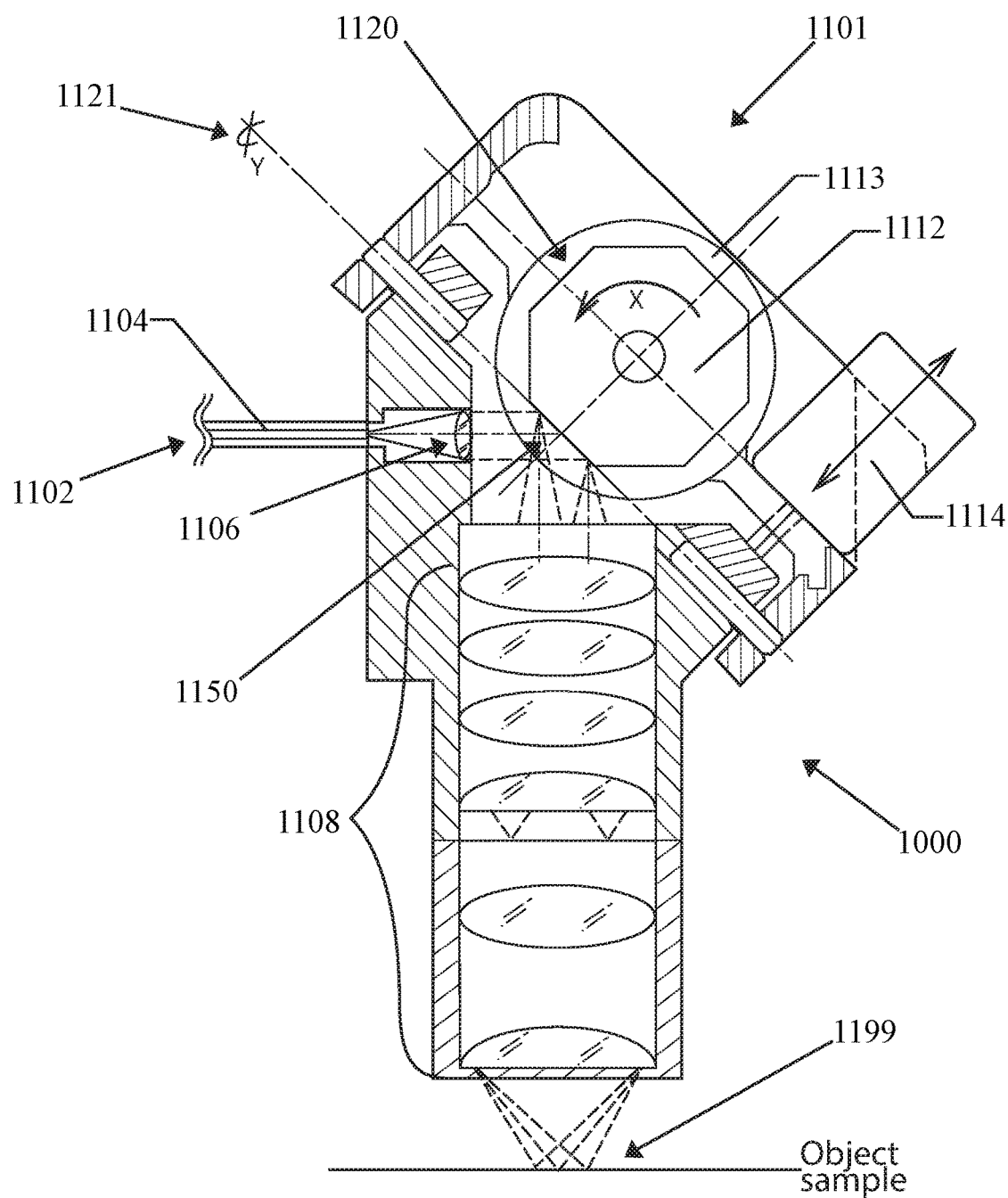
FIG. 12 is an illustration of another embodiment of the lenses and movement/scanning assembly of the profilometer device.

FIG. 12 is an illustration of another embodiment of the lenses and movement/scanning assembly of the profilometer device. As shown in FIG. 11, the profilometer device 1100 may comprise an x-y scanner 1101, fiber optics from white light source 1102, which may be directed to collimating lens/lenses 1106 through fiber optic cable 1104, second stage lenses 1108 designed to form a focused image of the scanned area and to reduce the focused scanned image to get the spot size and total image size down to 2 microns for high resolution or 10 microns for medium resolution. In this embodiment there is no third stage lenses. The second stage accomplishes the necessary focusing and reducing. Although six lenses are shown in FIG. 12, there may be as few as two and as many as dozens of lenses. The x-y scanner 1101 may comprise reflective polygon scanner mirror 1112, x-axis motor 1113, and y-axis motor which can be a direct drive motor or a motor driving a worm gear set or some type of cam coupling that could also be used for a repetitive scanning motion from a simple rotary motor 1114. For scanning in the Y-direction, the scanner 1101 may also be driven by a motor 1114, which may be an independent voice coil, linear, stepper or similar rotary motor. The Y-directional control will actuate the movement of the scanner along the Y-directional pivot 1121. In this manner, the movement assembly 1101 allows for scanning of the specimen 1199 in a raster pattern of image capture and reconstruction. FIG. 4 also shows that the polygon mirror 1112 may twist on x-axis 1120 in response to movement driven by motor 1113. The polygon mirror may be compatible with a 10-12 nm white light source beam diameter and may allow for a collimation beam at approximately 90 degrees from the final optics 1108. The scanner 1101 may preferably be able to perform a 6 to 35-degree optical scan—depending on the polygon. The polygon scanner 1101 may consist of compact ball bearings, and broadband enhanced reflective aluminum coating on the sides. The compact ball bearings may be housed on a mounting surface with an optical cantilever. The polygon mirror 1112 may have eight facets, as shown, and may be capable of moving, twisting, and/or actuating at speeds up to 10,000 RPM, giving on the order of 1333 Hz of light at the target plane. The scanner 1101 may have an approximately 90-degree feed angle and may return a 6 to 35-degree optical scan. The scanner motors may be powered by either induction or brushless motor technology. FIG. 4 shows that the light passing through the collimating lens/lenses 1106 reflects off mirror 1112 at point 1150 and is directed through the second stage lenses where these sets of lenses may vary with different applications which may require high (2 microns) or medium resolution (10 microns) with an NA on the order of 0.4 to 0.5 for many applications. They would be made up of standard or custom singlets, achromats, or aspheric lenses where the number of lenses will depend on the fields covered, spot size, and the NA of the output beam.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A white light axial chromatism device, comprising:
   a white light source;
   one or more collimating lenses;
   one or more second stage lenses;
   an X-Y directional scanner;
   a camera; and
   a grating;
   wherein said white light source generates a light that is directed through said one or more collimating lenses, then to the X-Y directional scanner, then through said one or more second stage lenses, then to a sample to be imaged;
   wherein a reflection light from said sample passes back through through said one or more second stage lenses, to said X-Y directional scanner, and through said one or more collimating lenses, and is sent to said grating;
   wherein said grating diffracts and splits said reflection light from said sample into a spectral wavelength output on a receiving surface;
   wherein said camera receives said spectral wavelength output from said receiving surface; and
   wherein said spectral wavelength output received by said camera is converted into digital data and sent to a signal processing assembly.

2. The device of claim 1, wherein said grating is concave; wherein said camera is a line scan camera and said line scan camera detects and resolves said spectral wavelength output from said concave grating, performs said digital data conversion, and transmits said digital data to said signal processing assembly.

3. The device of claim 1, further comprising said signal processing assembly and a fiber optics splitter;
   wherein said signal processing assembly comprises a host computer and a camera assembly controller, which comprises a processor and a memory;
   wherein said fiber optics splitter directs said white light source to said one or more collimating lenses and accepts said reflection light from said one or more collimating lenses.

4. The device of claim 3, wherein said host computer is configured to accept one or more user inputs, which comprises at least one of scan data, resolution data, camera settings, and calibration data.

5. The device of claim 3, wherein said host computer is configured to provide one or more outputs, which comprises at least one of a system status, three-dimensional plot data, imaging data, a plurality of three-dimensional plots, and one or more safety issues.

6. The device of claim 3, wherein said camera assembly controller comprises a processor and a memory;
   wherein said camera assembly controller is configured to: (1) receive instructions and calibration data from said host computer; (2) receive x-positional data; (3) receive y-positional data; (4) send movement instructions to said X-Y directional scanner; (5) send light instructions to said white light source; (6) interpolate z-coordinate data; (7) determine a saturation of said sample to be imaged; (8) perform one or more calibrations with said calibration data.

7. The device of claim 2, wherein said white light source comprises one or more of: (1) a repetition rate of approximately 27 MHz; (2) a visible power output of approximately 25 mW; and (3) a spectral output that is unpolarized with a single mode Gaussian output in the range of approximately 450 nm to 2000 nm.

8. The device of claim 7, wherein said line scan camera comprises one or more of:
   a minimum line rate of approximately 200 kHz;
   a total pixel capacity of at least 2000 pixels;
   a bit depth of between 8 and 12 bits;
   an operating temperature of 0-65° C.;
   a responsivity of at least approximately 65 Dn/nJ/cm2 at 1× gain for the 8-bit depth;
   a dynamic range of at least 65 dB;
   a visible light spectrum capability in the range of 400-700 nm; and
   a near-infrared light spectrum capability in the range of 700-1000 nm.

9. The device of claim 8, wherein an additional cross-talk that is created by a high intensity of said while light source is compensated for by said one or more second stage lenses, said X-Y directional scanner, and said one or more collimating lenses, which allows for an increased speed of making calibrations and adjustments to said X-Y directional scanner.

10. The device of claim 8, wherein said X-Y directional scanner is a reflective polygon scanner that comprises an x-axis motor and a y-axis motor.

11. The device of claim 10, wherein said white light axial chromatism device is configured to scan both stationary and moving samples.

12. A white light axial chromatism system, comprising:
   a white light source;
   one or more collimating lenses;
   a fiber optics splitter;
   one or more second stage lenses;
   one or more third stage lenses;
   an X-Y directional scanner;
   a line scan camera;
   a grating; and
   a signal processing assembly;
   wherein said signal processing assembly comprises a host computer and a camera assembly controller, which comprises a processor and a memory;
   wherein said white light source generates a light that is directed through said one or more collimating lenses, then to said X-Y directional scanner, then through said one or more second stage lenses, then through said one or more third stage lenses, then to a sample to be imaged;
   wherein a reflection light from said sample passes back through said one or more third stage lenses, through said one or more second stage lenses, to said X-Y directional scanner, and through said one or more collimating lenses, and is sent to said grating;

wherein said grating diffracts and splits said reflection light from said sample into a spectral wavelength output on a receiving surface;

wherein said camera receives said spectral wavelength output from said receiving surface;

wherein said spectral wavelength output received by said camera is converted into digital data and sent to a signal processing assembly;

wherein said fiber optics splitter directs said white light source to said one or more collimating lenses and accepts said reflection light from said one or more collimating lenses; and wherein said line scan camera corrects a resolution of said spectral wavelength output, performs said digital data conversion, and transmits said digital data to said signal processing assembly.

13. The system of claim 12, wherein said host computer is configured to accept one or more user inputs, which comprises at least one of scan data, resolution data, camera settings, and calibration data.

14. The device of claim 13, wherein said host computer is configured to provide one or more outputs, which comprises at least one of a system status, three-dimensional plot data, imaging data, a plurality of three-dimensional plots, and one or more safety issues.

15. The device of claim 14, wherein said camera assembly controller: (1) receives instructions and said calibration data from said host computer; (2) receives x-positional data; (3) receive y positional data; (4) send movement instructions to said X-Y directional scanner; (5) send light instructions to said white light source; (6) interpolate z-coordinate data; (7) determine a saturation of said sample to be imaged; (8) perform one or more calibrations with said calibration data.

16. The device of claim 15, wherein said white light source comprises one or more of: (1) a repetition rate of approximately 27 MHz; (2) a visible power output of approximately 25 mW; and (3) a spectral output that is unpolarized with a single mode Gaussian output in the range of approximately 450 nm to 2000 nm.

17. The device of claim 16, wherein said line scan camera comprises one or more of:
a minimum line rate of 200 kHz;
a total pixel capacity of at least 2000 pixels;
a bit depth of between 8 and 12 bits;
an operating temperature of 0-65° C.;
a responsivity of at least 65 Dn/nJ/cm2 at 1× gain for the 8-bit depth;
a dynamic range of at least 65 dB;
a visible light spectrum capability in the range of 400-700 nm; and
a near-infrared light spectrum capability in the range of 700-1000 nm.

18. The device of claim 17, wherein an additional crosstalk that is created by a high intensity of said while light source is compensated for by said one or more third stage lenses, said one or more second stage lenses, said X-Y directional scanner, and said one or more collimating lenses, which allows for an increased speed of making calibrations and adjustments to said X-Y directional scanner.

19. The device of claim 18, wherein said X-Y directional scanner is a reflective polygon scanner that comprises an x-axis motor and a y-axis motor.

20. A white light axial chromatism system, comprising:
a white light source;
one or more collimating lenses;
fiber optics splitter;
one or more second stage lenses;
one or more third stage lenses;
an X-Y directional scanner;
a line scan camera;
a grating;
a host computer; and
a camera assembly controller, which comprises a processor and a memory;

wherein said white light source generates a light that is directed through said one or more collimating lenses, then to said X-Y directional scanner, then through said one or more second stage lenses, then through said one or more third stage lenses, then to a sample to be imaged;

wherein a reflection light from said sample passes back through said one or more third stage lenses, through said one or more second stage lenses, to said X-Y directional scanner, and through said one or more collimating lenses, and is sent to said grating;

wherein said grating diffracts and splits said reflection light from said sample into a spectral wavelength output on a receiving surface;

wherein said camera receives said spectral wavelength output from said receiving surface;

wherein said spectral wavelength output received by said camera is converted into digital data and sent to a signal processing assembly;

wherein said line scan camera corrects a resolution of said spectral wavelength output, performs said digital data conversion, and transmits said digital data to said camera assembly controller;

wherein said host computer is configured to accept one or more user inputs, which comprises at least one of scan data, resolution data, camera settings, and calibration data;

wherein said host computer is configured to provide one or more outputs, which comprises at least one of a system status, three-dimensional plot data, imaging data, a plurality of three-dimensional plots, and one or more safety issues;

wherein said camera assembly controller: (1) receives instructions and said calibration data from said host computer; (2) receives x-positional data; (3) receive y positional data; (4) send movement instructions to said X-Y directional scanner; (5) send light instructions to said white light source;
(6) interpolate z-coordinate data; (7) determine a saturation of said sample to be imaged; (8) perform one or more calibrations with said calibration data;

wherein said X-Y directional scanner is a reflective polygon scanner that comprises an x-axis motor and a y-axis motor;

wherein said movement instructions cause at least one of said x-axis motor and said y-axis motor to actuate and adjust said X-Y directional scanner contemporaneously;

wherein said white light source comprises one or more of: (1) a repetition rate of approximately 27 MHz; (2) a visible power output of approximately 25 mW; and (3) a spectral output that is unpolarized with a single mode Gaussian output in the range of approximately 450 nm to 2000 nm;

wherein said line scan camera comprises one or more of:
a minimum line rate of 200 kHz;
a total pixel capacity of at least 2000 pixels;
a bit depth of between 8 and 12 bits;
an operating temperature of 0-65° C.;

a responsivity of at least 65 Dn/nJ/cm2 at 1× gain for the 8-bit depth;
a dynamic range of at least 65 dB;
a visible light spectrum capability in the range of 400-700 nm; and
a near-infrared light spectrum capability in the range of 700-1000 nm;
wherein an additional cross-talk that is created by a high intensity of said while light source is compensated for by said one or more third stage lenses, said one or more second stage lenses, said X-Y directional scanner, and said one or more collimating lenses, which allows for an increased speed of making calibrations and adjustments to said X-Y directional scanner.

* * * * *